United States Patent [19]

Ossbahr

[11] 4,014,428
[45] Mar. 29, 1977

[54] MODULAR ARTICLE CONVEYOR

[76] Inventor: Carl Gilbert Richard Ossbahr, Risbrinksvagen 36, 58244 Linkoping, Sweden

[22] Filed: May 21, 1975

[21] Appl. No.: 579,613

Related U.S. Application Data

[62] Division of Ser. No. 465,629, April 30, 1974, Pat. No. 3,931,882.

[30] Foreign Application Priority Data

May 4, 1973 Sweden .............................. 7306328

[52] U.S. Cl. .............................. 198/345; 198/472; 198/586; 198/592; 198/626; 198/339; 214/16.4 R; 214/95 R

[51] Int. Cl.² ........................................ B65G 15/12

[58] Field of Search .............. 198/20 R, 88, 93–97, 198/99–102, 162, 165, 339, 345, 472, 586, 592, 626, 627, 628, 645, 648; 214/16.1 CF, 16.4 R, 95 R; 104/180, 173 R, 172 B

[56] References Cited

UNITED STATES PATENTS

| | | | |
|---|---|---|---|
| 467,289 | 1/1892 | Mount et al. ..................... | 104/180 |
| 526,092 | 9/1894 | Wiggins ............................. | 104/180 |
| 699,133 | 5/1902 | Allis ................................... | 198/162 |
| 1,051,056 | 1/1913 | Bachelet .......................... | 214/95 R |
| 1,955,959 | 4/1934 | Harnischfeger et al. .... | 214/16.1 CF |
| 2,746,616 | 5/1956 | Sinclair ......................... | 214/16.1 CF |
| 3,193,085 | 7/1965 | Whipple ........................... | 198/165 |
| 3,706,369 | 12/1972 | Ishida et al. ...................... | 198/165 |

*Primary Examiner*—Evon C. Blunk
*Assistant Examiner*—Jeffrey V. Nase
*Attorney, Agent, or Firm*—Ira Milton Jones & Associates

[57] ABSTRACT

An article conveyor comprises a pair of belts, each trained around a pair of pulleys, with straight stretches between said pulleys. The four straight belt stretches are coplanar and parallel. One pulley for each belt is so driven that the belts move in opposite orbital directions. Corresponding stretches of the two belts are confined to lengthwise motion, as by additional freely rotatable pulleys or by a rail-like member for each of said stretches having a groove in which the belt is slidingly received. Each article carrier has belt engaging portions with long, laterally oppositely opening grooves in which said belt stretches are received, so that said stretches support and drive the carrier.

4 Claims, 15 Drawing Figures

FIG. 6d

MODULAR ARTICLE CONVEYOR

This application is a division of my copending application Ser. No. 465,629, filed Apr. 30, 1974, now U.S. Pat. No. 3,931,882.

This invention relates to conveyors by which various kinds of articles can be moved along a defined path, and the invention is more specifically concerned with an unusually versatile article conveyor that is advantageously adaptable to a wide variety of installations and to the transportation of many different kinds of articles.

A number of requirements can be set down for a satisfactory article conveyor. The importance of any one of these requirements depends upon the function and purpose of the particular conveyor to which it is applied, but complete satisfaction of all of the requirements is very desirable in every conveyor system. For example, a conveyor installed in a hospital, for transporting medical equipment, linens and the like, must operate with nearly absolute silence. Quiet operation is not so important in the conveyor used for transporting workpieces to and from machine tools in a manufacturing plant; but even in a machine shop a quietly operating conveyor is greatly preferably to a noisy one.

Again a conveyor used for bringing workpieces to and from an automatic machine tool should lend itself to precise positioning of each workpiece at the machine, so that the operation performed there will be accomplished accurately. While the capability for such accurate positioning may not be of great importance in a hospital conveyor, it is certainly not undesirable, especially if it can be attained without any offsetting disadvantage.

Other attributes that are either essential or very desirable in an article conveyor suggest themselves when consideration is given to the wide range of applications for such conveyors. Thus conveyors can be used for stocking goods in a central warehouse and for distributing goods from their storage locations in a warehouse to points of sale or shipment; for transporting luggage at airports and similar terminals; for sorting and distributing mail at post offices and for moving mail, documents and parcels within large buildings; and for transporting people within a large building or a part of a city.

From these and other conveyor applications that they suggest, it is apparent that a good article conveyor should be so arranged that its carriers or transporting units can have any of a variety of forms, as for example, flat plates or trays, boxes, or bins, hooks or slings, or specially designed fixtures for holding piece parts to be operated upon by a machine tool. Preferably, too, the conveyor apparatus should be so arranged that different kinds of transporting units can be used with its drive means, and can be randomly distributed along its length.

It is essential in many conveyor applications that there be provision for routing carriers of the conveyor system along alternate paths, to or from any selected one of several possible stations, and that the routing of carriers at junction and diversion points be accomplished quickly, smoothly and without interfering with the movement of other nearby carriers. In this connection it is often necessary that a conveyor system be capable of moving articles for a distance along a substantially horizontal path at one level and then transporting them up or down to another path portion or to a storage location at another level. In some cases, too, it may be very important that an article conveyor be capable of changing the orientation of an article and of effecting such change in orientation simultaneously with transportation of the article along a part of the conveyor path so that the article is in a desired orientation immediately upon arrival at its destination.

Another requirement that is important in some applications is that the conveyor system be compatible with other traffic. In such cases it may be necessary that the carriers of the conveyor system shall move along the same floor or pavement as other vehicles and pedestrians.

There are also installations in which it is important that the carriers be capable of starting, stopping and changing direction smoothly, silently, and without shock to articles being transported.

Another requirement that is perhaps important in every application but has seldom been satisfied in prior practice is that a conveyor system be so arranged as to lend itself to modular construction, so that the requirements of almost every conceivable installation can be met by a combination of standardized units of a limited number of different configurations. Such modular design, when achieved, obviously makes for low cost of the conveyor system and also has the advantage of expediting and simplifying its installation.

It goes without saying that low cost, simplicity, sturdiness, reliability, and ease of maintenance and repair are important requirements of any article conveyor.

Prior article conveyor systems have been able to meet some of these requirements satisfactorily, but heretofore no article conveyor has been able to fulfill all of them so completely and satisfactorily as to commend itself to every conceivable type of application.

It is therefore an object of the present invention to provide an article conveyor system which very satisfactorily meets all of the above stated requirements, and which is thus unusually versatile, being suitable for such widely diversified environments as hospitals, machine shops and offices.

Another object of this invention is to provide an article conveyor system which does not involve the chain drive that has heretofore characterized many such conveyors, and which therefore avoids the noise, complexity, heavy weight and high cost that inhere in chain conveyors, without, however, sacrificing any of the advantages of chain conveyors such as efficiency, verstility, durability and adaptability to widely varying applications.

With these observations and objectives in mind, the manner in which the invention achieves its purpose will be appreciated from the following description and the accompanying drawings, which exemplify the invention, it being understood that changes may be made in the specific apparatus disclosed herein without departing from the essentials of the invention set forth in the appended claims.

The accompanying drawings illustrate several complete examples of embodiments of the invention constructed according to the best modes so far devised for the practical application of the principles thereof, and in which:

FIGS. 6a–6e are fragmentary views in transverse vertical section illustrating several other modified embodiments of the invention;

Figure 1:
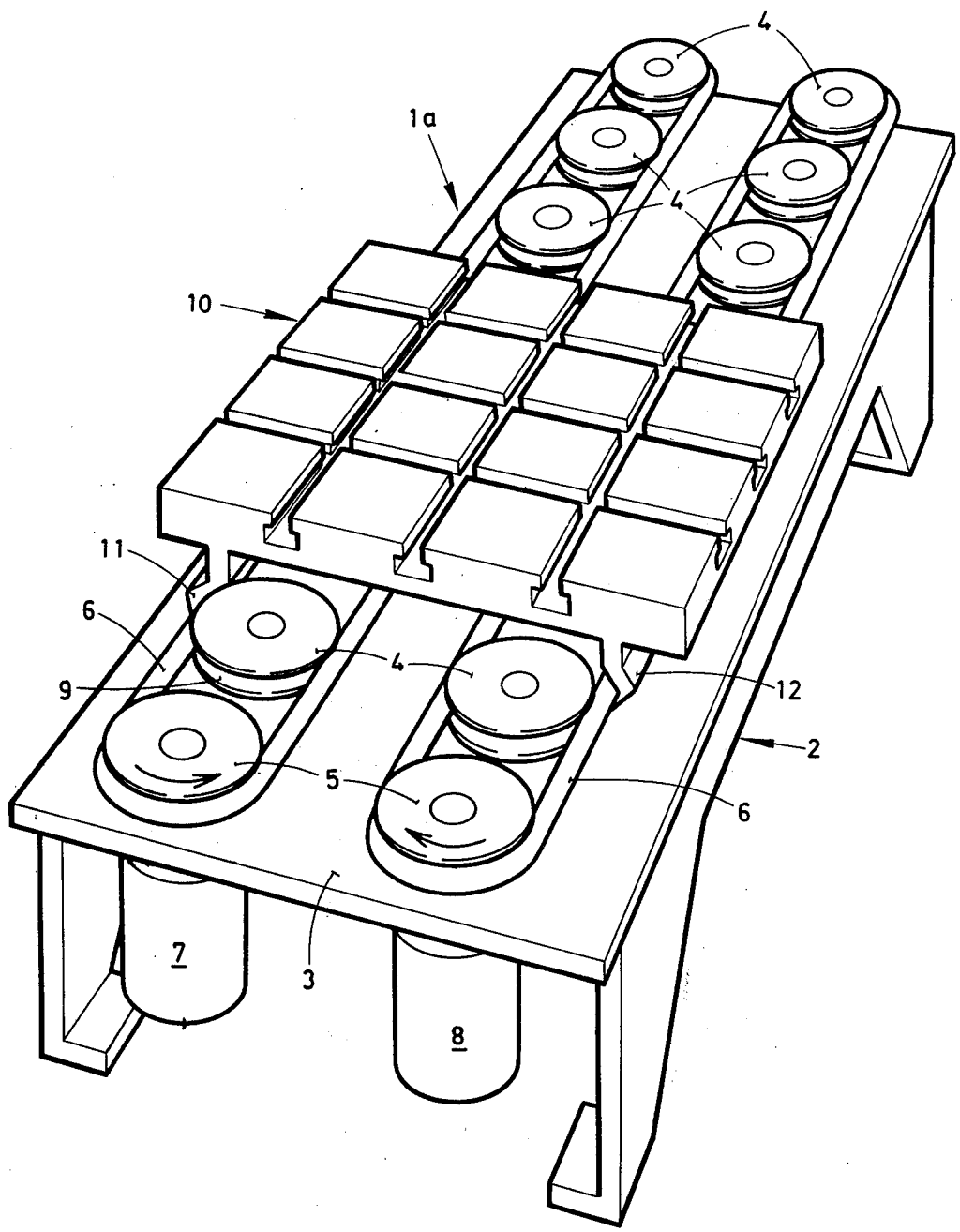
FIG. 1 is a top perspective view of one module of an article conveyor system that embodies the principles of the present invention, equipped with an article carrier which is capable of transporting any of a wide variety of types of articles but which is particularly intended to serve as a fixture plate to which a workpiece can be secured by means of stops and clamps.
Figure 2:
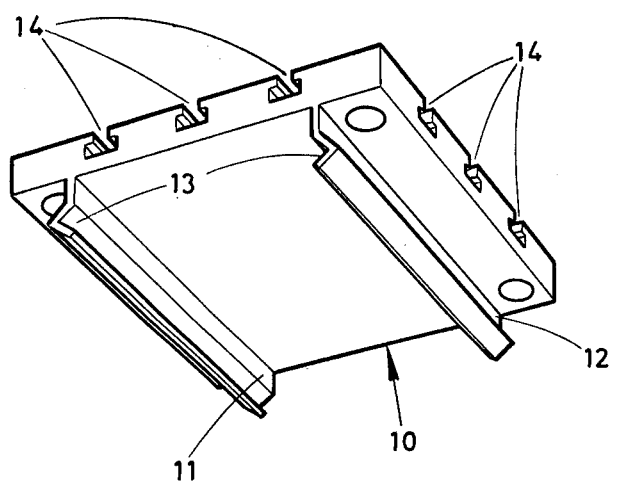
FIG. 2 is a bottom perspective view of the article carrier or carriage of the embodiment of the invention shown in FIG. 1.

Referring now to the accompanying drawings, the numeral 1a designates one form of modular conveyor unit embodying the principles of the present invention, adapted to be mounted above a floor or other supporting surface and thus comprising a frame 2 having legs which support a horizontal plate 3 that is in the nature of a table top. Flatwise overlying the plate 3 are a number of identical pulleys 4 that are arranged in two straight, parallel rows. All of the pulleys are constrained to rotation on upright axes that are fixed in relation to the plate or table top 3. An additional pulley 5 at one end of each row is similar to the other pulleys 4, but, instead of being freely rotatable, is rotatably driven. As shown, the pulley 5 for the left-hand row is driven by a directly coupled electric motor 7 which is mounted beneath the table top, and the pulley 5 for the right-hand row is driven by a similar motor 8, but the motors 7 and 8 drive the respective pulleys 5 in opposite directions. Obviously a single motor could be arranged to drive both pulleys 5. As the description proceeds it will be observed that in some cases the drive means for the pulleys 5 should be a reversible one, to provide for operation of the conveyor unit in either direction.

Trained around each row of pulleys 4, 5 is a flexible, elongated, endless belt 6 which serves as a driving and supporting element for article carriers 10 and which can be a more or less conventional power transmission belt. Between the driving pulley 5 at one end of each row and the freely rotatable pulley 4 at the opposite end of the row, each of the belts 6 has a pair of straight stretches that are supported and confined to lengthwise motion by the other pulleys 4 of its row. The four straight stretches of the two belts of course lie in a common plane parallel to the table top 6 and are all parallel to one another. Because of the opposite directions of rotation of the two pulleys 5, the laterally adjacent stretches of the two belts 6 — which can be regarded as their inner stretches — both move in one direction, while their outer stretches both move in the opposite direction.

The conveyor unit 1a is illustrated with a carriage or article transporting carrier 10 that has its body portion in the form of a fixture plate to which a workpiece can be secured to be presented to a machine tool. Projecting downwardly from the body portion of the carriage 10 and extending lengthwise along it are flange-like belt engaging portions 11 and 12. Each of the belt engaging portions is formed with a longitudinally extending groove 13 in which a belt 6 is receivable. The grooves 13 in the two belt engaging portions of the carriage open in laterally opposite directions and receive corresponding stretches of the two belts, that is, they cooperate with either the inner stretches or the outer stretches to support the carriage on those belt stretches and to frictionally constrain the carriage to move with them. As shown in FIG. 1 the belt engaging portions 11 and 12 cooperate with the outer stretches of the two belts, and the grooves 13 in them open towards one another.

It will be apparent that each of the flange-like members 11 and 12 cooperates with the pulleys that it opposes to constrain its adjacent stretch of the belt to lengthwise motion, and it is in turn confined by the belt stretch against any motion transverse thereto while being frictionally constrained to move lengthwise with the belt stretch. It will also be apparent that the groove defining portions of the flange-like members are preferably long enough to oppose three or more pulleys simultaneously, to enable the carriage to be smoothly transferred to another generally similar module established in end-to-end relation to the one illustrated.

Figure 3:
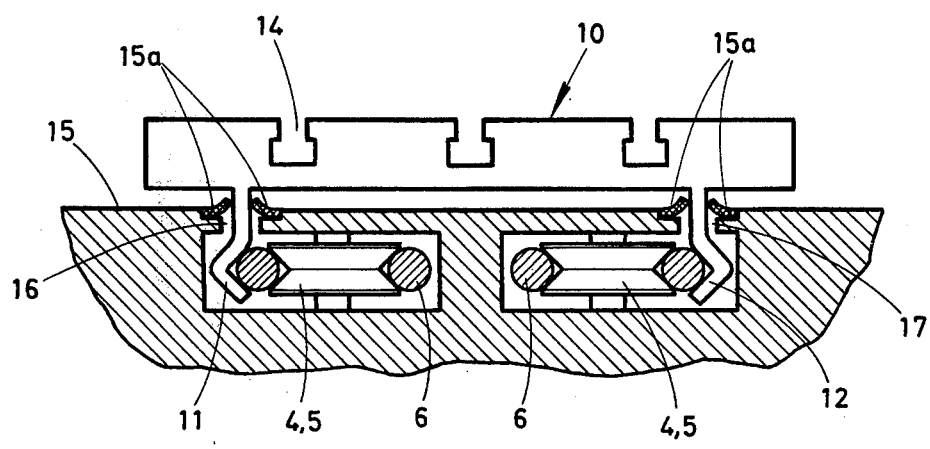
FIG. 3 is a view in cross section of an embodiment of the invention similar to that illustrated in FIG. 1 but with the carriage driving and supporting means of the conveyor mounted beneath a floor or similar surface that is intended to carry other traffic.

As shown in FIG. 3, the pulleys 4, 5 of each row and the belt 6 that is trained around them can be received in suitable recesses beneath the surface of a floor or machine table 15. The flange-like belt engaging portions 11 and 12 of the carriage 10 extend down into slots 16 that open upwardly from the recesses in which the pulleys and belts are housed, so that they can engage the belts while the plate-like body of the carriage rides along above the floor. For protection of the drive mechanism the slots 16 can be closed by strips 15a of rubber or similar resilient material that are yieldingly displaced by passage of the flange-like members. It will be apparent that the presence of the conveyor system will not interfere with other traffic that has to cross its path, and it will also be observed that the area above the conveyor system is completely clear and unobstructed at all times that a carriage is not present in it.

Figure 4:
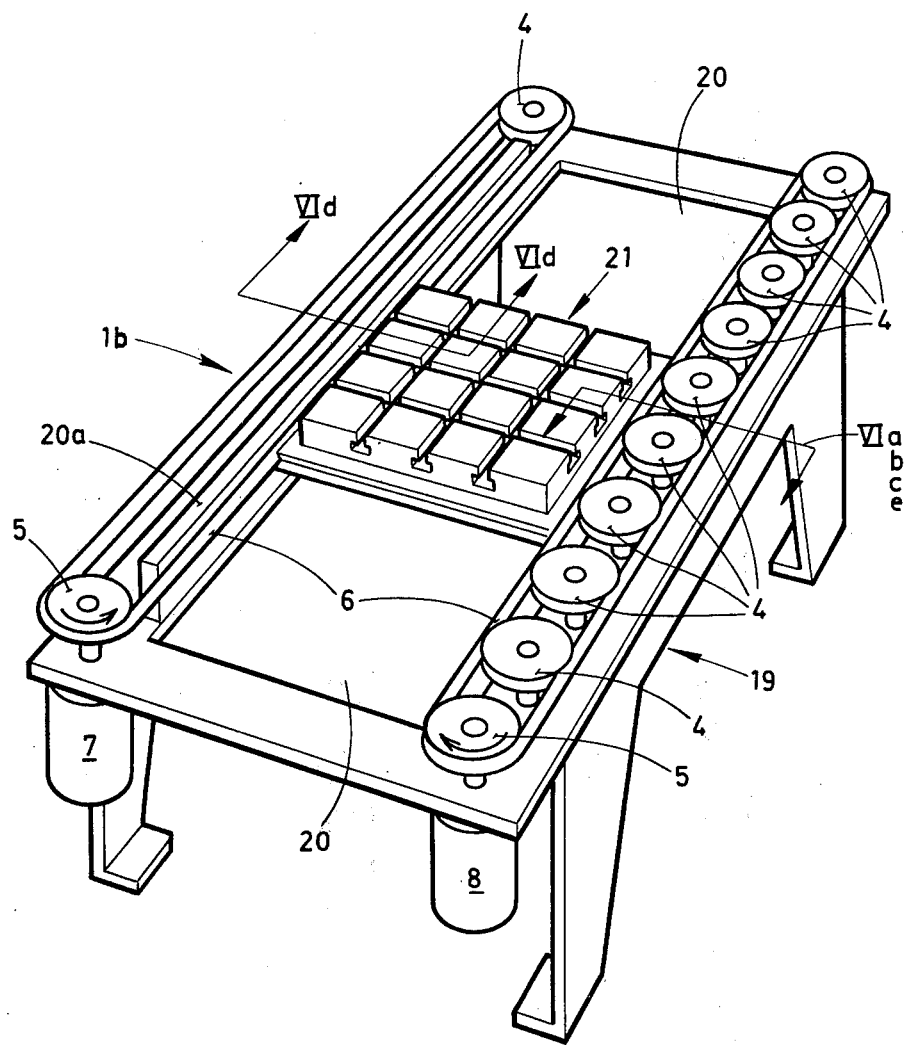
FIG. 4 is a perspective view generally like FIG. 1 but illustrating a substantially modified embodiment of the invention.
Figure 5:
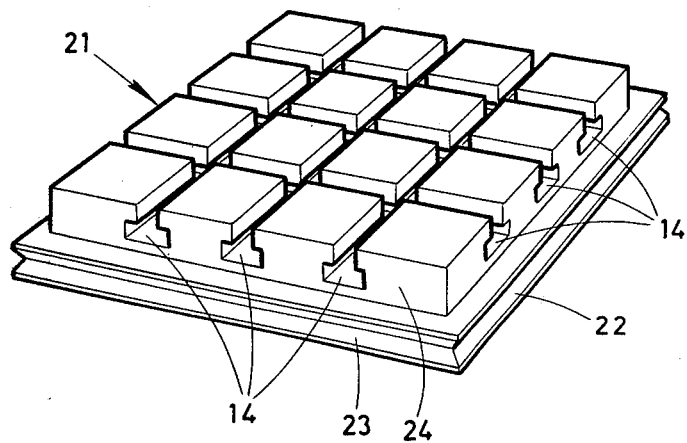
FIG. 5 is a top perspective view on an enlarged scale of the article carrier of the embodiment of the invention illustrated in FIG. 4.

In the embodiment of the invention illustrated in FIG. 4, the modular unit 1b has a table-like frame 19 that is substantially wider than its carriage or article carrier 21, and its top can have a large central cutout 20. In this case the carriage 21 cooperates with the inner stretches of the belts 6, which are spaced apart by a substantial distance. As best seen in FIG. 5, the body plate of the carriage is square in planform, and the belt engaging portions of the body plate comprise its four edge portions, which are porvided with edgewise outwardly opening grooves 22, 23. In effect the body plate is directly confined between the inner stretches of the two belts.

To further illustrate the variety of forms in which the invention can be embodied, FIG. 4 shows the right hand belt 6 trained around a row of pulleys 4, 5, as in the embodiment illustrated in FIG. 1, but the left-hand belt 6 is trained around only a driven pulley 5 and a single freely rotatable pulley 4. The inner straight stretch of the left-hand belt is confined against lateral displacement by a support rail 20a that is provided with a groove in which the belt rides.

FIGS. 6a–6e illustrate further modifications of the carriage, the belts 6, and the drive and support means for the belts.

Figure 6A:
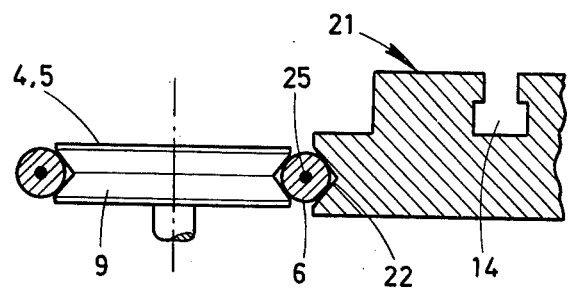

In FIG. 6a the carriage 21 is like that illustrated in FIGS. 4 and 5, and the belt 6 is supported by a row of pulleys 4, 5 as in the right hand part of FIG. 4. In this case the belt 6 is of round cross section and is made of an elastic material, such as rubber, but has a central reinforcing cord 25. The grooves 9 and 22 in the pulleys and the carriage respectively are V-shaped, to cooperate with the round belt in supporting and driving the carriage. It will be apparent that the elasticity of the belts provides for some small displacements of the carriage relative to the pulleys, in directions transverse to the belt stretches, to enable the carriage to be established in an accurate position of adjustment at a machine tool while the carriage remains engaged with the belts.

Figure 6B:
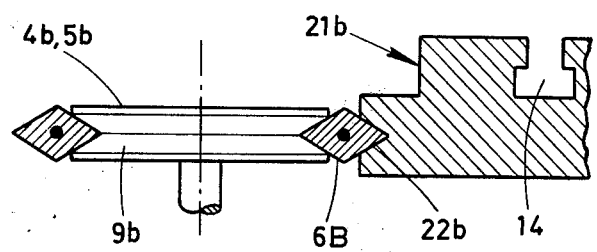

The embodiment illustrated in FIG. 6b is like that illustrated in FIG. 6a with respect to its pulleys 4b,5b and carriage 21b, but the side surfaces of the V-shaped belt receiving grooves 9b and 22b are more sharply angled to accommodate a cord-reinforced elastic belt 6B of rhombic cross section.

Figure 6C:
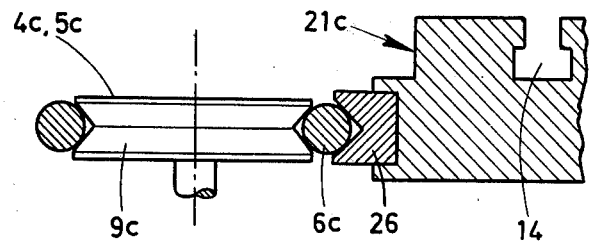

In FIG. 6c the belt 6c is of substantially inelastic material, such as steel cable. The necessary elasticity for insuring good driving engagement between the carriage 21c and the belt, and for enabling the carriage to be displaced small distances transversely relative to the straight stretches of the belts, is obtained by forming the belt engaging portion of the carriage as a strip 26 of elastic material in which the V-shaped belt engaging groove is formed and which is snugly received in a channel-shaped groove in the carriage that extends along its full length. The elastic belt-engaging portion 26 can be made of rubber and can be vulcanized to the body of the carriage.

FIG. 6d illustrates an arrangement generally like that shown at the left-hand side of FIG. 4, wherein a cord-reinforced elastic belt 6 of circular cross section is trained around a pair of pulleys 4, 5 and has one of its straight stretches supported by a lengthwise extending rail-like member 20a that has a groove 20b in which the belt is guidingly received.

Figure 6E:
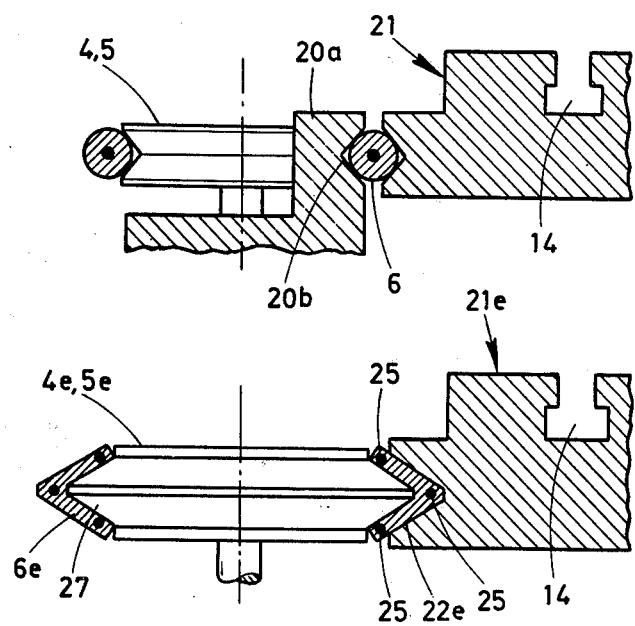

In FIG. 6e the belt 6e is shown with a V-shaped cross-section and is made of elastic material reinforced with cords 25. The pulleys 4e, 5e are crowned instead of grooved, with a V-shaped convex periphery 27 that is receivable between the legs of the belt. The carriage 21e has a V-shaped groove 22e in which the belt is closely receivable It will be obvious that the body plate of the carriage could comprise a tray or the bottom part of a traveling bin or the like. However, in the embodiments of the invention illustrated in FIGS. 1–7 the carriage is shown as comprising a fixture plate with inverted T-shaped slots 14 that open to its upper surface, spaced from one another at equal intervals and crossing one another at right angles. Various holders, fixtures and clamps can be removably received in these grooves.

Figure 7:
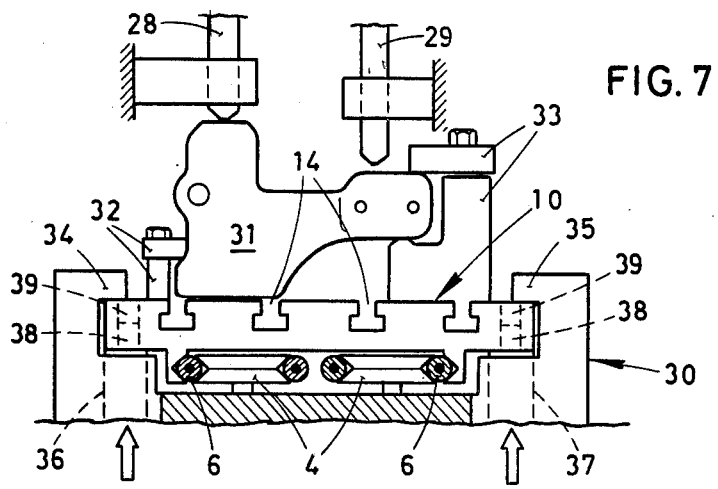
FIGS. 7, 8 and 9 are views in transverse vertical section illustrating different arrangements whereby a workpiece secured to an article carrier of a conveyor of this invention can be held in a predetermined position to be operated upon by means of a machine tool.
Figure 8:
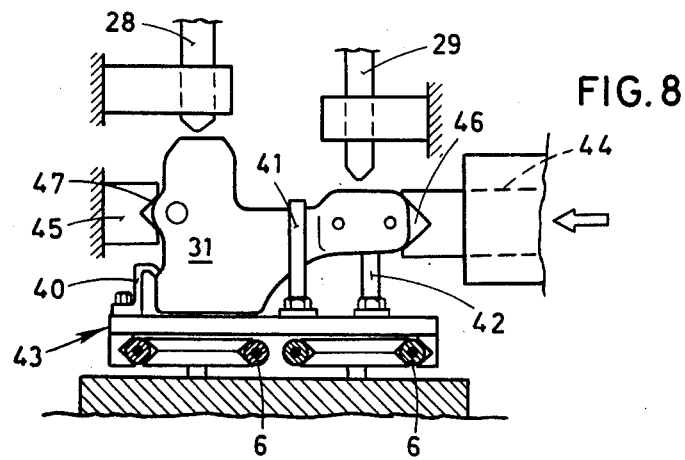
Figure 9:
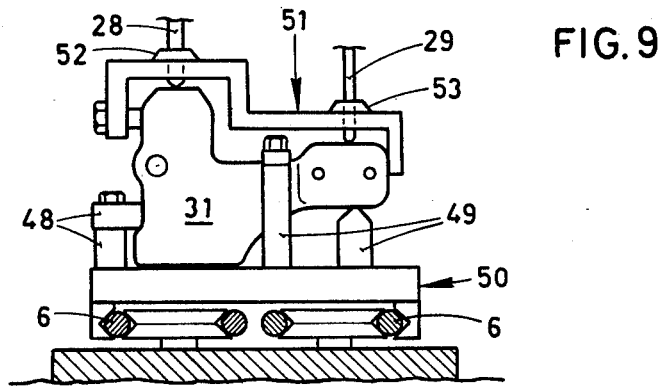

FIGS. 7, 8 and 9 illustrate various arrangements by which a workpiece mounted upon a carriage of an article conveyor of this invention can be established in exactly a desired position and orientation at a machine tool work station, to have one or more operations performed upon it by the machine tool.

In FIG. 7, a conveyor generally like that of FIG. 1 presents a workpiece 31 to a pair of machine tool elements 28, 29, which may be drills, milling cutters or the like and which are intended to operate upon the workpiece. Clamps 32 and 33, anchored in the T-slots 14 of the carriage, secure the workpiece to the carriage. At the station at which the tool elements 28 and 29 are to operate there is a clamping structure which is generally designated by 30 and which comprises clamping shoulders 34 and 35 that overlie top surface portions of the carriage near opposite side edges thereof. Rams 36 and 37, located generally beneath the clamping shoulders 34 and 35, can be raised to engage the underside of the carriage and force the carriage up into clamping engagement with the clamping shoulders. Upwardly projecting positioning pins 38 on the rams are receivable in guide holes 39 in the carriage body when the rams are raised, to establish the carriage in a desired position and confine it against edgewise displacement. Since the clamping shoulders 34 and 35 need be spaced no more than about 0.5 mm above the top surface of the carriage when the carriage is normally supported, the resilience of the belts 6 can readily accommodate the slight displacement of the carriage that brings it to the position in which it is clamped by the rams and clamping shoulders.

As illustrated in FIG. 8, a workpiece 31 is secured to a carriage 43 comprising a fixture plate of different form, by means of clamps 40, 41, 42 that may comprise a more or less permanent part of the carriage assembly. Since the carriage itself is not intended to be secured to any station structure, and therefore need not absorb any machining forces, it can comprise a fixture plate which is smaller and lighter than those described above. In this case one or more horizontally movable rams 44 engage one side of the workpiece itself to clampingly force it against one or more fixed guide shoulders 45 at its other side. The rams and the guide shoulders have V-grooves 46 and 47, respectively, in their workpiece engaging faces, to establish the position of the workpiece in the up and down directions and also in directions edgewise of the fixture plate of the carriage. Again, displacements of the carriage from its normal belt-supported position are accommodated by elasticity of the belts 6.

FIG. 9 illustrates a carriage comprising a somewhat heavier fixture plate 50 than that illustrated in FIG. 8, to which a workpiece 31 is secured by means of clamps 48, 49. A jig 51 is clamped to the top of the workpiece and extends across it. Bushings 52, 53 in the jig receive and guide the respective machine tool elements 28 and 29 for their operation upon the workpiece. Any displacement of the jig 51 and workpiece 31 that is required to enable the tool elements 28 and 29 to enter the bushings 52 and 53 can be absorbed by the elasticity of the belts 6.

Figure 10:
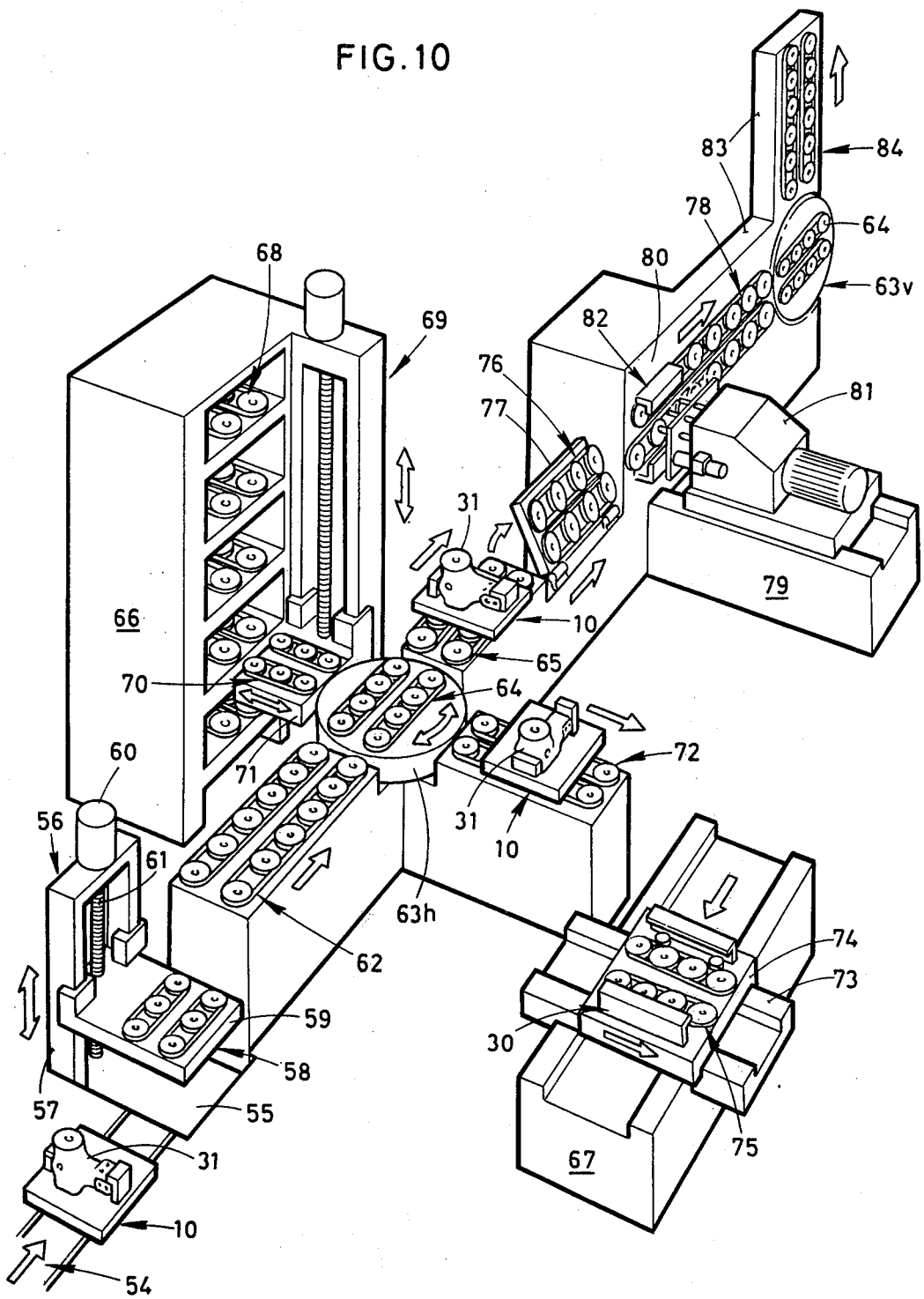
FIG. 10 is a perspective view illustrating how a number of different modular units embodying the principles of this invention can be combined into a conveyor system adapted for cooperation with several different machine tools.

FIG. 10 illustrates how a number of different modular conveyor units of this invention can be combined in a complete conveyor system that provides for performance of a number of conveying, storing and machining functions.

An infeed portion 54 of the conveyor is illustrated as corresponding to the embodiment of the invention shown in FIG. 3, with the drive and support mechanism of the conveyor installed beneath the workshop floor. A carriage 10 to which a workpiece 31 is clamped moves along just above the surface of the floor. The conveyor portion 54 brings the carriage to a floor shaft 55 at which there is an elevator or hoisting mechanism 56 comprising an upright frame 57 that affords guidance to a vertically translatable conveyor module 58. The module 58 has drive and support mechanism comprising pulleys and short belts mounted on a horizontal shelf 59 that is guided by the frame 57 for up and down motion. The shelf 59 is moved up and down by a jack screw 61 driven by a directly coupled electric motor 60 mounted on the frame 57. With the shelf 59 in its lowermost position it can receive a carriage 10 from the conveyor module 54 and then raise the carriage to the level of another module 62 which is at an elevation above the floor and which in turn moves the carriage to a turntable 63h.

There is a short length of conveyor 64 on the turntable, which rotates on an upright axis. When the turntable is in its rotational position in which the conveyor section 64 thereon is aligned with the conveyor section 62, the turntable module can forward a carriage straight through to another lengthwise aligned elevated module 65. Alternatively, the turntable can be rotated through 90° to align its conveyor segment with transverse conveyor segment modules 70 and 72. The module 70 comprises another elevator, with a shelf 71 that is guided for up and down movement by means of a frame 69. The elevator module 70 cooperates with a buffer store 68 having superimposed fixed horizontal shelves, each comprising a short module. The elevatable module 70 can be moved vertically to the level of any of the shelves of the buffer store, to enable a carriage and the workpiece thereon to be fed into or removed from the buffer store. The short module 72 at the opposite side of the turntable from the buffer store feeds carriages onto and off of another short conveyor module 75, comprising a table 74 that is longitudinally slidable on ways 73, said ways being in turn slidable on transverse bed ways 67. The bed ways 67 may comprise part of a machine tool having a clamping station such as is shown in FIG. 7.

The short elevated conveyor module 65 feeds carriages onto another conveyor module 76 that comprises a shelf-like member 77 hinged along one longitudinal side edge to swing between a horizontal position, aligned with the module 65, and a vertical position aligned with a further module 78 along which carriages move in a vertical on-edge position. A suitable ram or the like (not shown) swings the module 77 about its hinge axis and can thus change the orientation of a carriage (and the workpiece it carries) as the carriage is being transported lengthwise along the module 77. The module 78 is mounted on an upright portion 80 of the frame 79 of a machine tool. A multi-spindle drilling head 81 of the machine tool is movable axially on ways 79 that constitute a part of the machine frame to carry tools into and out of engagement with a workpiece on the conveyor segment 78. While the tools of the head 81 are acting upon the workpiece, the carriage to which it is fixed is held by a clamping station 82.

From the module 78 carriages can be fed onto a module 64 which comprises another turntable 63v, rotatable on a horizontal axis. From tha turntable carriages can in turn be moved onto an upwardly extending conveyor unit 84 that transports the carriages vertically up the wall 83 of the machine frame.

The routing of the carriages to and from the several conveyor modules and their movements along those modules can be controlled in a known manner, by suitable eletronic or other control apparatus (not shown) in order to achieve optimal flow of workpieces through the machine group.

Figure 11:
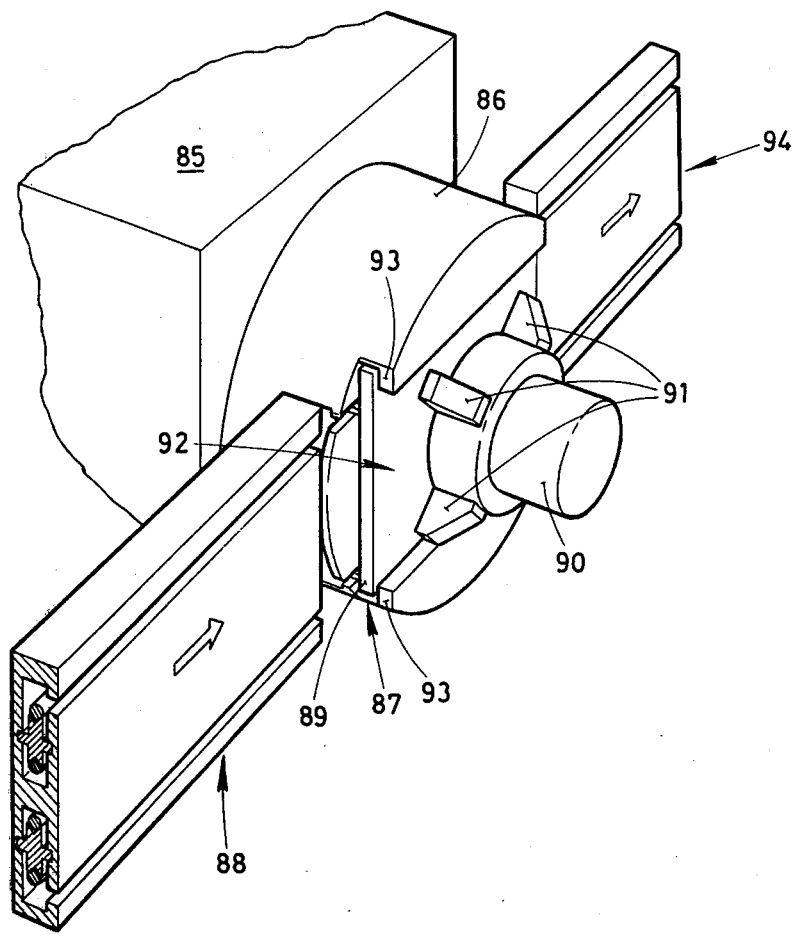
FIG. 11 is a perspective view illustrating conveyor modules of this invention in their cooperation with a lathe chuck station.

It will be apparent that machine tools of many different types can be fed and served by means of conveyor apparatus embodying the principles of this invention. By way of a further example, FIG. 11 illustrates a lathe 85 having a chuck 86 that is provided with a clamping station 87 of the general type shown in FIG. 7. A conveyor unit 88, of the general type shown in FIG. 3, is mounted in a vertical wall of the lathe frame, and each of the carriages cooperable with the conveyor is in the form of a fixture plate 89 to which a workpiece 90 can be secured by means of clamps 91 that comprise parts of the fixture plate assembly. The lathe chuck also comprises a short conveyor unit 92 of this invention and a clamping station comprising opposing shoulders 93. Rams (not shown) cause the shoulders 93 to clampingly confine the fixutre plate 89 while the machining operation is in progress. At the conclusion of that operation the fixture plate is moved onto a further conveyor unit 94 at the opposite side of the chuck from the module 88.

From the foregoing description taken with the accompanying drawings it will be apparent that this invention provides an article conveyor that is quiet in operation, unusually versatile, inexpensive, trouble free, and nicely adapted to being constructed in the form of a number of standardized modules that can be readily combined in various ways to suit the requirements of any installation.

Those skilled in the art will appreciate that the invention can be embodied in forms other than as herein disclosed for purposes of illlustration.

The invention is defined by the following claims:

1. A conveyor system whereby an article can be transported along a defined path in which the article undergoes a change in the direction of its transporting movement, said conveyor system comprising:
   A. a pair of supporting members, one of which is movable in opposite directions relative to the other, each of said supporting members having thereon
      1. a pair of elongated endless belt elements;
      2. two pairs of pulley-like members, one pair for each of said belt elements and around which the belt element is trained;
      3. means on each supporting member constraining its pulley-like members to rotate on spaced apart substantially parallel axes and fixing their locations in such relation to one another and to the supporting member that
         a. each of said belt elements has straight inner and outer stretches extending lengthwise between its pulley-like members,
         b. all portions of the two belt elements are disposed substantially in a single plane, and
         c. at least one stretch of each belt element is parallel to its corresponding stretch of the other belt element and is laterally spaced a substantial distance therefrom; and
      4. means for rotatably driving one of the pulley-like members of each of said pairs thereof, said means constraining said driven pulley-like members to rotate at substantially equal circumferential speeds but in opposite directions so that said parallel stretches of the two belt elements move lengthwise in the same direction;

B. means for moving said one supporting member to and from a position relative to the other at which said parallel stretches of the belt elements on the respective supporting members are in endwise adjacent lengthwise aligned relationship with one another; and C. a carriage comprising
1. a carrier portion that is at least as wide as the distance between the inner stretches of laterally adjacent belt elements and which is substantially entirely spaced in one direction from said plane and has means thereon for carrying an article at its side remote from said plane, and
2. opposite elongated belt engaging portions on said carrier portion projecting therefrom in the direction toward said plane and across said plane and defining oppositely opening grooves in which said parallel stretches of the belt elements are receivable, said belt engaging portion being cooperable with one another and said parallel stretches of the belt elements to support the carrier portion in spaced relation to the belt elements, confine it against substantial motion in all directions transverse to said parallel stretches, and enable it to be frictionally driven by said parallel stretches in the direction of their movement, each of said belt engaging portions having a length substantially greater than the diameter of said pulley like members so that the carriage can pass smoothly from the belt elements on one of said supporting members to those on the other when said one supporting member is in its said one position relative to the other 2. The conveyor of claim 1, further characterized by each of said supporting members having:
guide at fixed locations along said parallel stretches of the belt elements, engaging said stretches and cooperating with the belt engaging portions of the carriage to confine them to lengthwise motion.

3. The conveyor system of claim 1 wherein the other of said supporting members is located at a work performing station having article holding means movable in a pair of opposite directions substantially transverse to said belt stretches and cooperable with one another to confine an article on the carriage in a predetermined position and orientation, and wherein said belt elements are made of a resiliently compressible elastic material, the resilience of said material enabling carriage to be displaced slightly in the last mentioned directions so that the article can attain exactly said position and orientation while the belt elements remain in said grooves in the belt engaging portions.

4. The conveyor means of claim 1, further characterized by:
the belt elements being made of elastic material that accommodates small displacements of the carriage relative to the guide means and affords good frictional engagement with the belt engaging portions of the carriage.

* * * * *

UNITED STATES PATENT OFFICE
CERTIFICATE OF CORRECTION

Patent No. 4,014,428  Dated March 29, 1977

Inventor(s) CARL GILBERT RICHARD OSSBAHR

It is certified that error appears in the above-identified patent and that said Letters Patent are hereby corrected as shown below:

| | |
|---|---|
| Col. 4: | Line 62, "porvided" should read --provided-- |
| Col. 5: | Line 19, "displacements" should read --displacement-- |
| Col. 7: | Line 65, "tha" should read --that-- |
| Col. 8: | Line 4, "eletronic" should read --electronic-- |
| Col. 9: | Line 21, "portion" should read --portions-- |
| Col. 10: | Line 7, "means" should precede "at" |
| Col. 10: | Line 19, "the" should follow "enabling" |

Signed and Sealed this

Thirteenth Day of September 1977

[SEAL]

Attest:

RUTH C. MASON
Attesting Officer

LUTRELLE F. PARKER
Acting Commissioner of Patents and Trademarks